Oct. 20, 1953            W. F. HORNS            2,656,128
AUTOMATIC FILM ADVANCER FOR ROLL FILM CAMERAS
AND BRAKE AND RELEASE MEANS THEREFOR
Filed Oct. 29, 1948            2 Sheets-Sheet 1
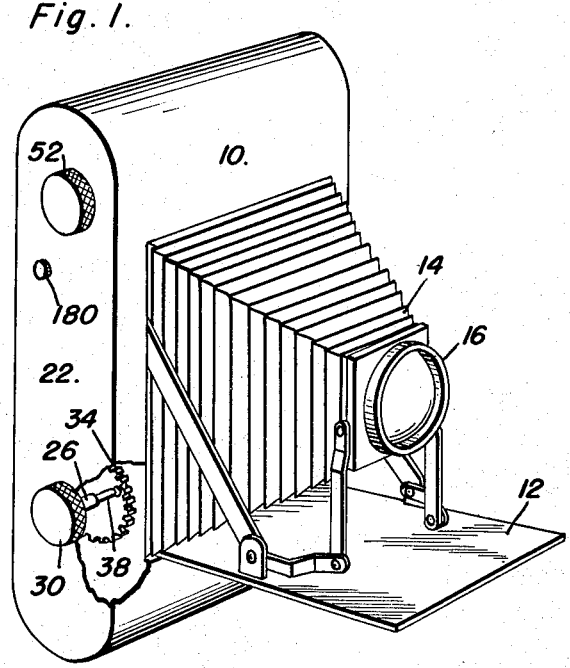
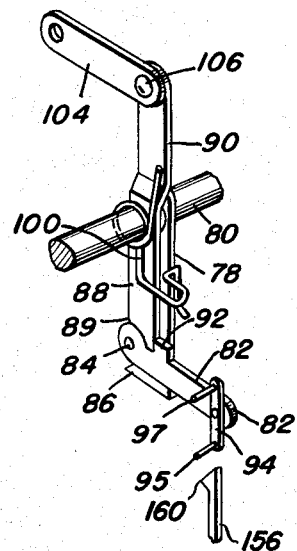
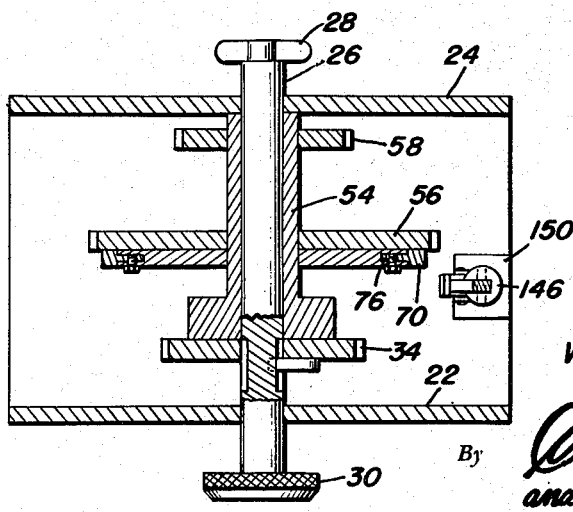
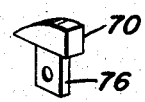
Inventor
Winfield F. Horns
By Clarence A. O'Brien
and Harvey B. Jackson
Attorneys Oct. 20, 1953  W. F. HORNS  2,656,128
AUTOMATIC FILM ADVANCER FOR ROLL FILM CAMERAS
AND BRAKE AND RELEASE MEANS THEREFOR
Filed Oct. 29, 1948  2 Sheets-Sheet 2

Inventor
Winfield F. Horns
By Clarence A. O'Brien
and Harvey B. Jacobson
Attorneys

Patented Oct. 20, 1953

2,656,128

UNITED STATES PATENT OFFICE 2,656,128

AUTOMATIC FILM ADVANCER FOR ROLL FILM CAMERAS AND BRAKE AND RELEASE MEANS THEREFOR

Winfield F. Horns, Kankakee, Ill.

Application October 29, 1948, Serial No. 57,202

6 Claims. (Cl. 242—71)

This invention relates to improvements in an automatic film advancer for a roll type camera and is by way of particular improvement over the type of transmission mechanism disclosed in my co-pending application Serial No. 42,003, filed August 2, 1948, which discloses a novel braking means for a conventional spring motor and a novel control means and release means for the braking means.

The object of the present invention is to provide certain improvements for simplifying the braking and control means, reduce the number of parts and obtain a more inexpensive device, which is more efficient and smoother in operation and results in material practical advantages as will appear hereinafter.

The principal purpose of this invention is to automatically control the successive positioning of the exposure sections of a roll film in alignment with the lens action of a camera by automatically preventing the transmission of power from a spring motor to a driven shaft of a winding spool, whenever the successive exposure sections are aligned with the camera lens.

A meritorious features of this invention resides in the provision of a control unit for actuating a brake mechanism to brake the spring motor, the control mechanism being mounted on the driven shaft of the winding spool and including a wheel having a series of circumferentially spaced adjustable cams which, as the wheel is rotated on the driven shaft by the spring motor to wind themselves on a feeding spool, sequentially engage a tripping mechanism for actuating the braking means.

Another meritorious feature of this invention resides in the provision of a manually operated rectilinearly moving lever selectively engageable with the tripping mechanism for releasing the braking means and rendering the spring motor operative to drive the driven shaft and unwind a predetermined length of the roll film off a feeding spool onto a winding spool.

These and ancillary objects and other meritorious features are attained by this invention, a preferred embodiment of which is set forth in the following description and illustrated in the accompanying drawings, wherein:

Figure 1 is a view in perspective of a conventional folding camera with an automatically controlled film transmission mechanism, constructed in accordance with the principles of the instant invention, associated therewith;

Figure 4 is a transverse sectional view taken on line 4—4, Figure 3;

Figure 5 is a view in perspective of the actuating structure for opening and closing the brake shoes on the brake drum, and Figure 6 is a view in perspective of one of the cams adjustably and detachably carried by the cam wheel.

Figure 2:
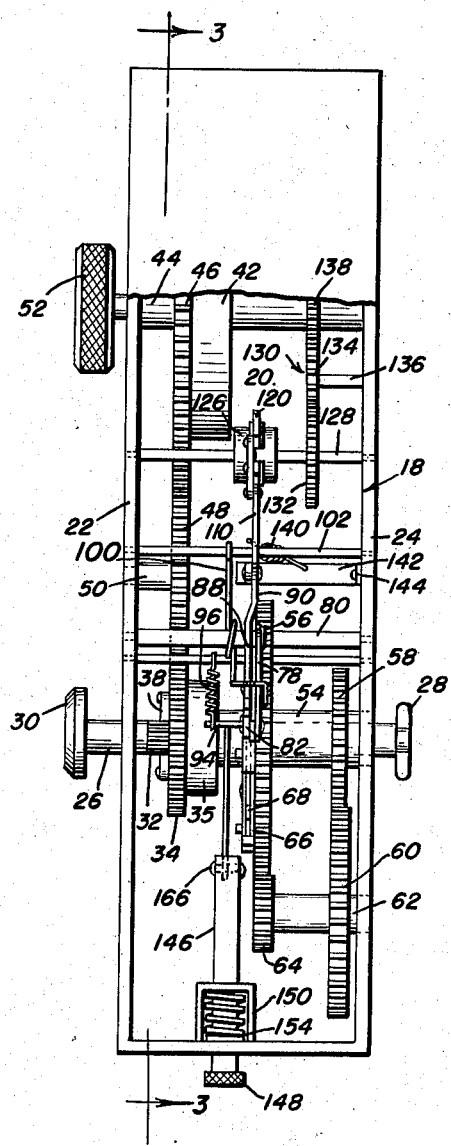
Figure 2 is a plan view of the film transmission mechanism.

A conventional folding camera 10 is shown in Figure 1 and includes a hingedly mounted front member 12 upon which unfolds a conventional bellows 14 having a lens 16 disposed at the outer end thereof. The particular structure of the camera is not material, as this invention, generally designated by the character reference 18 is adapted for attachment to any type of camera, which uses a roll type film. In this respect, the film advancing or film transmission structure, 18, is secured at one of the longitudinally extending side edges of the camera casing, in a manner so that the lens and shutter mechanism of the camera is not obstructed nor the operation thereof impaired.

The film advancing structure is disposed in a housing 20 defined by one of the sides 22 of a camera and a longitudinally extending parallel partition member 24.

A driven shaft 26 is rotatably mounted transversely through the side walls 22 and 24 of the housing 20 and is provided at its inner end with a flat key 28, adapted to lockingly engage in a conventional groove or slot formed in a film roller or spool. A knurled knob 30 is formed integrally on the outer end of the shaft and disposed exteriorly of the camera casing, so that, if desired, the shaft 26 may be manually rotated to rotate a winding spool disposed on the keyed end 28.

The shaft is splined as at 32 and a gear 34 is disposed on the shaft adjacent the splined section. A pair of oppositely disposed pawls or dogs 36 and 38 are carried by the gear and are urged into engagement of the splines 32 by spring bars 40.

A conventional spring motor 42 is carried by a shaft 44 and is drivingly connected with the gear 34 by means of a driving gear 46 carried by the shaft 44 and an intermediate idler gear 48, the latter being secured on a bearing stud 50 extending inwardly from the wall 22. A knurled knob 52 is formed on the outer end of the shaft 44, so that the spring motor 42 may be manually wound. Thus, the spring motor 42 rotates the gear 46 and through the gear train rotates the gear 34, carrying the dogs 36 and 38 engaged in the splines 32 to rotate the shaft 26. The shaft 26 is slidably disposed to move the keyed end 28 inwardly and outwardly relative to the wall 24, so that a winding spool may be inserted and removed from the camera.

Means is provided and said means forms the major subject matter of the instant invention, to automatically control the rotation of the driven shaft 26 by braking the spring motor 42 and rendering the same inoperative. In this respect, a sleeve 54 is disposed on the shaft 26 between the wall 24 and the gear 34. The sleeve has a bearing in the wall 24 and is secured to the gear 34 by a collar 35. A gear 56 is rotatably disposed on the sleeve, adjacent the gear 34 and a smaller gear 58 is non-rotatably disposed on the sleeve adjacent the wall 24. A gear reduction system including a gear 60 mounted on a stud 62 and disposed in meshing engagement with the gear 58 and a smaller gear 64 carried by the stud and disposed in meshing contact with the gear 56 is provided. Thus, as the gear 34 rotates to rotate the driven shaft 26, the gear 56 is rotated through the gear reduction system and a cam wheel 66 formed integrally therewith is rotated correspondingly. The cam wheel 66 is provided with a series of circumferentially arranged peripheral slots 68 within which are adjustably and detachably positioned a series of cams 70. The cams 70 are locked in the slots 68 by screws or the like fastening members 72, the latter extending transversely through the cam wheel and being adjustably disposed in arcuate slots 74 formed therein. In this respect, the cams are provided with depending apertured lugs 76, the same being adapted to receive the fastening member 72 for positioning the working surface of the cam in a selected pre-arranged position on the cam wheel.

A control lever 78, is freely disposed at one end on a transverse shaft 80 which is rotatably journalled between the walls 22 and 24. A dog 82 is formed with a lower rounded end which is pivoted as at 84 to the other end of the lever 78, and the lever is provided with a lateral offset cam end 86 engaged on the cam wheel 66. An operating lever 88 is secured on the spindle or shaft 80, adjacent the pivoted end of the control lever 78. The lever 88 is provided with an end extension 90, the latter being offset from the longitudinal plane of the lever to extend in a plane between the control lever 78 and the lever 88. A latching protuberance or a shoulder 92 is formed laterally on the dog 82, above the pivot point 84 and is projected forwardly to engage on the extended end of the lever 88 to lock the operating lever 88 to the control lever 78 for movement with the latter, to control the operation of the spring motor, as will be later described. The extending end of the lever is formed with a semi-circular or arcuate recess 89 to receive the rounded end of the dog at the pivot. An arm 94 is pivotally carried by the upper end of the dog 82 and has a pair of parallel laterally extending pins 95 and 97. A spring 96 is anchored at one end to the pin 95 and secured at its other end to a pin 98 which extends transversely between the walls 22 and 24. The spring 96 functions to retain the shoulder 92 in engagement on the end of the operating lever 88, as will be more clearly apparent in considering the operation of the device. To maintain the cam end 86 of the lever in engagement on the cam wheel at all times, there is provided a spring 100. The spring 100 is secured to a transverse pin 102 at one end and is coiled about the spindle 80, adjacent the lever 88. The other end of the spring is inturned from the anchored end and bears against the top edge or upper surface of the control lever 78.

Figure 3:
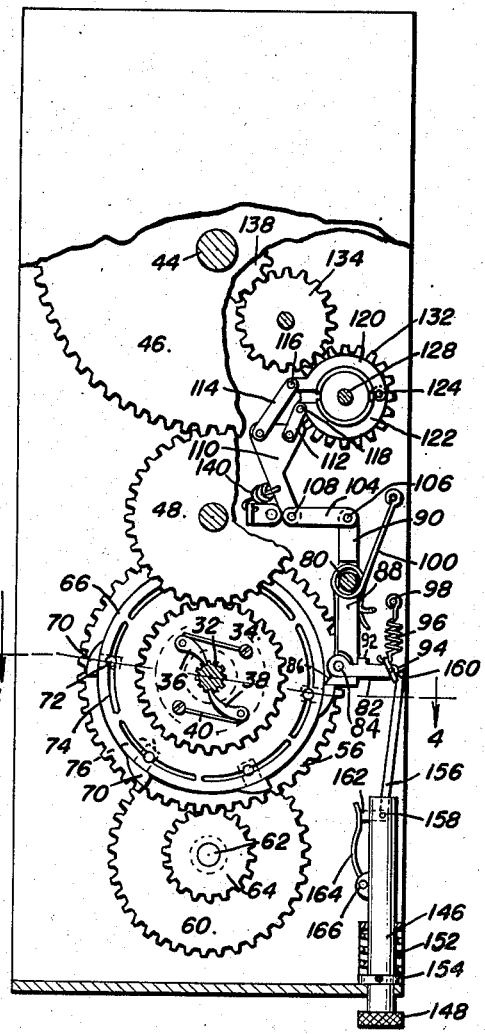
Figure 3 is a sectional view taken on line 3—3, Figure 2.

A connecting link 104 is pivoted as at 106 to the end of the offset end 90 of the lever 88 and is pivoted at its other end, as at 108 to a block lever 110. Actuating links 112 and 114 are pivoted to the other end of the block lever and are pivotally associated as at 116 and 118 with a pair of arcuate brake shoes 120 and 122. The brake shoes are commonly pivoted together as at 124 and operatively disposed on a brake drum 126 secured on a transverse shaft 128. When the brake shoes are clamped on the brake drum, as will be later described, the spring motor or driving means is rendered inoperative through the medium of a gear train 130. The gear train includes a gear 132 secured on the shaft 128, an intermediate idler gear 134 journalled on a laterally extending bearing stud 136 and a gear 138 secured on the driving shaft 44 of the spring motor 42. When the shoulder 92 is engaged on the end of the lever 88, as seen in Figures 3 and 5, the brake shoes are clamped on the brake drum 126 and the gear train 130 is locked so that rotation is denied the gear 46 and the driving shaft 44 and the spring motor is prevented from unwinding. However, upon disengagement of the locking shoulder 92 from the end of the lever 88, a spring 140 which is secured at one end to the block lever 110 biases or urges the block lever to open the arcuate brake shoes, the latter moving about the common pivot point 124 out of clamping engagement of the brake drum. The block lever 110, as it is moved to its brake opening position, actuates the link 104, which is connected to the extension 90 of the lever 88, and moves the end of the lever 88 which is adapted to engage the shoulder 92 of the dog 82, away from the cam wheel 66. The spring 140 is anchored at its other end to an angular bracket 142, which is secured as at 144 to the inner surface of the wall 24. The bracket 142 also functions as a stop block to engage the block lever 110 and control the extent of opening of the brake shoes.

Manually operated actuating means is provided for disengaging the shoulder 92 from the lever 88 and includes a tubular or rod-like member 146 which is slidably disposed through the lower end of the camera casing and mounted for rectilinear movement inwardly of the casing. A knurled knob or button 148 is formed on the outer end of the tube so that the same may be pushed inwardly. The tube travels through a cylindrical guide 150 and resilient means 152 is disposed about the tube between the end of the guide and a stop plate 154 secured on the tube. In this respect, the tube is automatically released or urged outwardly, after being pressed inwardly by manual pressure applied to the button 148. A lever 156 is pivoted as at 158 in the inner end of the tube and is provided with an offset cam end 160 engageable with the lateral pin 97. The lever is formed, adjacent its pivoted end, with a lateral extension 162, which is engaged by a spring bar 164 pivoted as at 166 to the tube. In this manner, the cam end 160 is maintained in the same horizontal plane, except for a momentarily downward movement caused by the sliding engagement of the cam on the pin 97, before the hook is moved upwardly by the spring 164 into latching engagement with the pin.

The operation of this device is believed very simple and may be described as follows: A spool of sensitized photographic film is disposed in the usual manner on a pair of spindles or the like in one end of the enclosing case and the outer end portion of the film is unwound to extend it past the lens and shutter mechanism and over a winding roller, which is locked on the key end 28 of the shaft 26. The portion is attached frictionally or otherwise conventionally secured to the unwinding spool and the cover of the enclosing case is replaced in its normal position.

The spring power unit or spring motor 42 will be readied for operation by rotating the knob or wheel 52 and the camera will be employed in the conventional manner, the film section aligned with the shutter mechanism being exposed by employing the shutter control button 180.

After the first frame or section of the film has been exposed, the user will press button or thumb wheel 148 to align the next and proper specified section of the film with the lens. The inward movement of the thumb button 148 causes the tubular member 146 to slide inwardly and moves the cam end or terminal 160 of the lever 156 into locking or latching engagement of the lateral pin 97. Release of the button 148 allows the spring 152 to bias the tubular member 146 outwardly and correspondingly moves the dog 82 about its pivot point 84 releasing the shoulder 92 from engagement of the lever end 88. At this moment, the spring 140, being under tension, contracts and moves the lever end 90 in a counterclockwise direction as viewed in Figure 3, the pivot block moving to the left and the actuating links 112 and 114 functioning to move the brake shoes 120 and 122 about their pivot point 124 into an open position. This unlocks the gear train 130 and allows the spring motor to operate, whereby rotation is imparted through the gears 46, 48 and 34 to the shaft 26. Rotation of the shaft 26, of course, rotates the winding spool secured on the key end 28. As the shaft 26 rotates, the cam wheel 66 is rotated and the cams 70 rotate integrally therewith. As the cam wheel rotates, the cam corresponding to the next section or exposure frame of the film is brought into engagement with the cam end 86 of the lever. When the section is nearly aligned with the lens, the cam end 86 engages the working surface of the dog 82. When the cam end 86 of the lever 78 engages the working surface of the cam 70, the dog 82 is moved away from the cam wheel 66 and around the end of the lever 88 until the shoulder 92 engages the end of the lever 88 and moves thereon to a position thereabove. When the shoulder moves about the lever 88, the spring 96 contracts and moves the dog forwardly about its pivot point to latch the shoulder onto the lever end 88. Then, as the dog 82 moves past the cam 70, the arm 78 and dog carried thereby are urged toward the cam wheel 66 by the spring 100, and into engagement therewith, the lever 88, engaged by the dog, moving the arm 78 and thereby moving the lever end 90 to the right as viewed in Figure 3, with the block lever 110 being moved into a position, shown in Figure 3 to close the brake shoes. This, of course, immediately brakes the spring motor 42 and the film section is held in alignment with the lens and shutter mechanism.

Obviously, the cams 70 are adjustable on the circumferential periphery of the cam wheel so that various sized film can be employed in an accurate manner. Inasmuch as the spacing between the cams 70 carried by the cam wheel corresponds to the spacing between each successive sensitized section of film, it can be seen that for some film, the cams would have to be adjusted. However, it is proposed to provide a scale or the like on the cam wheel, so that the same may be adjusted in accordance with various types of conventional film.

Obviously, after every exposure of the film, a new section will be placed in position by the automatic mechanism, reactive to inward pressure exerted on the knob 148. Of course, the drive mechanism and control and braking means is adapted for attachment to every type of conventional camera that employs a roll film. And yet further, the mechanism can be successfully employed for use in transferring successive sections of other material or for use with various types of winding and reeling devices, wherein an automatically controlled and operated winding device is desired. Thus, since many other purposes and objects of this invention become apparent to those skilled in the art, upon a perusal of the foregoing description and accompanying drawings, it is to be understood that certain changes may be effected thereon as coming within the spirit of the invention and scope of the appended claims.

Having described the invention, what is claimed as new is:

1. In combination with a roll film type camera, an automatic film transmission device including a driven shaft engageable with a winding spool, a prime mover operatively associated with said shaft, a cam wheel carried by said shaft and having a plurality of circumferentially spaced adjustable cams, braking means for said prime mover to successively brake the prime mover so that each successive sensitized section of the film is positioned for exposure, a lever actuated by said cam wheel operating said braking means, and release means selectively releasing said braking means, said release means including a slidably disposed cam selectively engaging said lever and resilient means responsive to engagement of the cam with the lever.

2. An automatic film winder for a roll film type camera comprising a spool winding shaft, drive means for rotating said spool winding shaft, a cam wheel operatively connected to said drive means for rotation thereby, cam means on said wheel, means for braking said drive means, a control lever mounted for movement towards and away from said cam wheel, an operating lever movably mounted adjacent said control lever and operatively connected to said brake means, means responsive to engagement of said control lever with said cam means for selectively locking said operating lever to said control lever for movement therewith, and means engaging said control lever for urging said operating lever into its brake actuating position when said control lever is disengaged from said cam means.

3. An automatic film winder for a roll film type camera comprising a spool winding shaft, drive means for rotating said spool winding shaft, a cam wheel operatively connected to said drive means for rotation thereby, cam means on said wheel, means for braking said drive means, a control lever mounted for movement towards and away from said cam wheel, an operating lever movably mounted adjacent said control lever and operatively connected to said brake means, means responsive to engagement of said control lever with said cam means for selectively locking said operating lever to said control lever for movement therewith, and means engaging said control lever for urging said operating lever into its brake actuating position when said control lever is disengaged from said cam means, means for selectively releasing said means for locking operating lever to said control lever, and means for urging said brake means to its inoperative position.

4. An automatic film winder for a roll film type camera comprising a spool winding shaft, drive means for rotating said spool winding shaft, a cam wheel operatively connected to said drive means for rotation thereby, a cam member on said wheel, means for braking said drive means, a control lever mounted for movement towards and away from said cam wheel, means yieldingly urging said control lever into engagement with said cam wheel to be actuated by said cam member, an operating lever disposed adjacent said control lever and operatively connected to said brake means, means for locking said operating lever to said control lever for movement therewith, cam means on one of said levers for selectively actuating said lever locking means in response to engagement of said control lever with said cam member on said wheel, whereby said means for urging said control lever into engagement with said cam wheel urges said operating lever into its braking position when said control lever passes said cam member, and means for selectively releasing said locking means.

5. An automatic film winder for a roll film type camera comprising a spool winding shaft, drive means for rotating said spool winding shaft, a cam wheel operatively connected to said drive means for rotation thereby, a cam member on said wheel, means for braking said drive means, a control lever mounted for movement towards and away from said wheel, means yieldingly urging said control lever into engagement with said cam wheel, an operating lever disposed adjacent said control lever and operatively connected to said brake means, means yieldingly urging said brake means into its release position and said operating lever away from said wheel, means limiting movement of said operating lever away from said wheel, means carried by said control lever for locking said operating lever thereto, means yieldingly biasing said locking means into its operating lever locking position, and cam means carried by said control lever for urging said locking means into locking engagement with said operating lever as said control lever engages said cam member, said means for urging said control lever into engagement with said wheel moving said operating lever into its brake means actuating position when said control lever becomes disengaged from said cam member.

6. The combination of claim 2 wherein said brake means includes a brake drum operatively connected to said drive means, and a brake band disposed on said drum.

WINFIELD F. HORNS.

References Cited in the file of this patent

UNITED STATES PATENTS

| Number | Name | Date |
|---|---|---|
| 433,020 | McKellen | July 29, 1890 |
| 1,201,002 | Treadaway et al. | Oct. 10, 1916 |
| 1,448,414 | Mietzelfeld | Mar. 13, 1923 |
| 1,539,489 | Hughes et al. | May 26, 1925 |